United States Patent
Voyer

(10) Patent No.: US 7,120,432 B2
(45) Date of Patent: Oct. 10, 2006

(54) METHOD OF SIMULATING OPERATING CONDITIONS OF A TELECOMMUNICATION SYSTEM REQUIRING A LIMITED AMOUNT OF COMPUTING POWER

(75) Inventor: Nicolas Voyer, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 125 days.

(21) Appl. No.: 10/724,212

(22) Filed: Dec. 1, 2003

(65) Prior Publication Data

US 2004/0166862 A1 Aug. 26, 2004

(30) Foreign Application Priority Data

Dec. 2, 2002 (EP) .................................. 02292964

(51) Int. Cl.
*H04Q 7/20* (2006.01)
(52) U.S. Cl. .................. 455/423; 455/446; 455/67.11; 455/63.1
(58) Field of Classification Search ................ 455/450, 455/423, 67.11, 446, 63.1
See application file for complete search history.

(56) References Cited

U.S. PATENT DOCUMENTS

| | | | |
|---|---|---|---|
| 5,675,581 A * | 10/1997 | Soliman | 370/252 |
| 5,953,661 A * | 9/1999 | Schwinghammer et al. | 455/423 |
| 6,272,450 B1 | 8/2001 | Hill et al. | |
| 6,360,098 B1 * | 3/2002 | Ganesh et al. | 455/436 |
| 6,408,185 B1 * | 6/2002 | Freeman et al. | 455/446 |
| 6,771,934 B1 * | 8/2004 | Demers et al. | 455/63.1 |
| 2002/0105921 A1 | 8/2002 | Sawyer et al. | |

FOREIGN PATENT DOCUMENTS

EP 1 148 658 A 10/2001

OTHER PUBLICATIONS

Neubauer T et al. "Required Network Size for System Simulations in UMTS FDD Uplink", 2000 IEEE, Sixth ISSSTA, pp. 481-485.
Makato Aihara et al. "Development of Radio Simulator", NEC Research & Development, Nippon Electric LTD. Tokyo, JP, No. 90, Jul. 1988, pp. 99-105.
Neubauer T et al. "Required Network Size for System Simulations in UMTS FDD Uplink", 2000 IEEE, Sixth ISSSTA, pp. 481-485, no month listed.
Makoto Aihara et al. "Development of Radio Simulator", NEC Research & Development, Nippon Electric LTD. Tokyo, JP, No. 90, Jul. 1988, pp. 99-105.

* cited by examiner

*Primary Examiner*—Erika A. Gary
(74) *Attorney, Agent, or Firm*—Oblon, Spivak, McClelland, Maier & Neustadt, P.C.

(57) ABSTRACT

A method of simulating operating conditions of a telecommunication system including computing at least one value of an interference parameter of at least one mobile transceiver, the interference parameter being indicative of an amount of interference affecting a communication between the mobile transceiver and an associated radio base station, identifying radio base stations and mobile transceivers that generate a significant amount of interference affecting the communication, and selecting data of radio base stations and mobile transceivers identified during the identification step for an execution of the computing step.

29 Claims, 3 Drawing Sheets

METHOD OF SIMULATING OPERATING CONDITIONS OF A TELECOMMUNICATION SYSTEM REQUIRING A LIMITED AMOUNT OF COMPUTING POWER

CROSS REFERENCE TO RELATED APPLICATIONS

This application claims benefit of priority under 35 U.S.C. § 119 to European Patent Application 02292964 filed Feb. 12, 2002, the entire contents of which are incorporated by reference herein.

BACKGROUND OF THE INVENTION

1. Field of the Invention

The present invention relates to a method of simulating operating conditions of a telecommunication system including a plurality of radio base stations and a plurality of mobile transceivers.

2. Discussion of the Background

Such methods are currently used for optimizing, before actual physical implementation of a telecommunication system, a deployment of radio base stations forming a network in the system and a design of a decision-making network infrastructure to manage the network in order to define a telecommunication system that provides optimal communication service at the lowest possible cost.

Some simulation methods, known as mapping methods and currently used for optimizing GSM-type telecommunication systems, often referred to as 2G (second generation) systems, generate best-server maps showing geographical coverage areas, each area forming a cell including a single base station to assess the coverage of the system, following a general principle that if a mobile transceiver is located within a cell and if the associated base station is not saturated, the mobile transceiver will be provided with a satisfactory communication service.

An assessment of quality of service in UMTS-type telecommunication systems, often referred to as 3G (third generation) systems, cannot be accurately obtained by means of a method as described above, mainly because 3G systems do not perform a frequency planning as is done in 2G systems, where two different mobile transceivers located in a same geographical area are allocated two different communication frequencies to minimize interference between the mobile transceivers. In 3G systems, no such frequency planning is performed, so that communication interference between mobile transceivers can and will occur, which will adversely affect the quality of each ongoing communication to an extent which varies from one mobile transceiver to another according to the specific situation of each mobile transceiver, which extent cannot be predicted by means of the above-mentioned described methods.

Another known simulation method, usually referred to as Monte-Carlo method, mainly consists in generating a plurality of snapshots, each being descriptive of a predetermined, random-generated situation of the system. Each snapshot then shows the location of all mobile transceivers of the system in the corresponding situation, the base stations with which the mobile transceivers are communicating, and a level of power each mobile transceiver is applying to its ongoing communication, which enables to deduce the amount of interference the mobile transceiver generates for other mobile transceivers located in its vicinity, and thus the extent to which interference generated by other mobile transceivers adversely affects each single mobile transceiver in each random-generated situation. The operation of such a method is described, among others, in European Patent Application EP 1 148 658 A1.

The Monte-Carlo method hence enables to establish, for each random-generated situation, the number of mobile transceivers to which a satisfactory communication service is provided, and enables statistical assessment of the overall communication quality offered by the simulated system.

The amount of interference affecting each communication between a given mobile transceiver and an associated radio base station is represented by a value of an interference parameter, for example a signal-to-noise ratio, which is computed, in the known art, by means of complex formula which take into account all other communications simultaneously going on in the whole simulated telecommunication system, because of the lack of frequency planning in 3G systems.

Such formula can for example be expressed as follows:

For each mobile transceiver MSi, a signal-to-noise ratio $SINR_{i,j}$ representing the amount of interference affecting a communication involving the mobile transceiver MSi and generated by communications going on in a cell Cellj including a radio base station BSj is given by:

$$SINR_{i,j} = \frac{P_{Ti,j}.G_{i,j}}{N_0 + \sum_{l \neq j} \sum_{k \notin Cellj} P_{Tk,j}.G_{i,j} + \alpha MS \cdot \beta \cdot \sum_{k \in Cellj} P_{Tk,j}.G_{i,j}},$$

where $P_{Tij}$ represents an amount of power transmitted by the radio base station BSj to the mobile transceiver MSi, $G_{ij}$ represents a coupling loss between the mobile transceiver MSi and the radio base station BSj., $N_0$ represents a predetermined noise value, $\alpha_{MS}$ represents an interference removal factor and $\beta$ represents a channel orthogonality factor.

The overall signal-to-noise ratio $SINR_i$ representing the amount of interference affecting the communication involving the mobile transceiver MSi and generated by all communications going on in all other cells of the telecommunication system is then given by:

$$SINR_i = \sum_{All\,j} SINR_{i,j}.$$

It is easily understood that a computation of interference parameters such as the signal-to-noise ratios described above will require a huge amount of computing power, since the 3G telecommunication systems to be realistically simulated will typically involve thousands of radio base stations and hundred of thousands of mobile transceivers. Moreover, all values involved in such a computating step, like coupling loss values $G_{ij}$ and transmitted power values $P_{Tij}$, have to be stored in a memory and read during the execution of the computing step, which, again because of the enormous quantity of those values, will require huge memory space and processing power for performing all necessary read/write operations.

The present invention aims at ameliorating the above-mentioned problems, by providing a method of simulating operating conditions of a telecommunication system, which method requires less computing power and less memory space than currently used methods.

SUMMARY OF THE INVENTION

Accordingly, according to one aspect of the present invention, there is provided a method of simulating operating conditions of a telecommunication system including a plurality of radio base stations and a plurality of mobile transceivers, the method including a step of computing at least one value of at least one interference parameter of one of the mobile transceivers, the at least one interference parameter being indicative of an amount of interference affecting a communication between the mobile transceiver and an associated radio base station, a step of identifying radio base stations and mobile transceivers that generate a significant amount of interference affecting the communication and a step of selecting data of radio base stations and mobile transceivers identified during the identification step for an execution of the computing step.

Such a method enables to select only a small part of the data which is used in known methods for computing the interference parameter. This in turn enables to use less memory space for storing the selected data and less computing power for processing the data during the execution of the computing step.

It should be noted that the radio base stations identified during the identification step are recognized as stations which produce significant effects, not as those stations which produce the most significant effects. Such a subtle difference, which underlies a basic operating principle of the invention, enables to dispense with a ranking of all cells which would again require huge memory space for storing all values to be compared together in order to establish the ranking, and a huge amount of computing power for actually comparing all these values.

The degree of significance may be expressed by choosing at least one specific criterion, which should preferably be decorrelated with respect to the above-mentioned data.

In a specific embodiment of the present invention, a method as described hereinbefore further includes a step of creating, for a given cell including a radio base station, a neighbor list containing identities of neighbor cells including radio base stations with which a mobile transceiver in the given cell could potentially establish a communication, the identification step identifying neighbor cells of the given cell including the mobile transceiver to which the interference parameter is computed.

The neighbor list may simply be constituted of a monitored set of cells generated by a radio network controller and broadcasted to all mobile transceivers included in each given cell, each mobile transceiver then monitoring the strength of pilot signals coming from each cell in the monitored set, as set forth in a 3GPP TS 25.331 standard specification.

The neighbor list may also be constituted of cells having a coverage area geographically adjacent to that of the given cell, such cells being neighbors of the given cell in a literal sense.

In any case, according to this specific embodiment of the present invention, all data not pertaining to cells included in the neighbor list of the given cell including the mobile transceiver to which the interference parameter is computed will be discarded.

In another specific embodiment of the present invention, the identification step identifies cells which are neighbors to a predetermined degree of the cell including the mobile transceiver to which the interference parameter is computed.

This other specific embodiment enables to perform, in a simple and user-friendly manner, a compression of the data to be used during the computing step. An operator of a simulation device in which a method according to this specific embodiment of the invention is used will only have to enter a degree N of neighborship for tuning the accuracy of the computation performed during the computing step.

If the operator chooses N=1, only data pertaining to cells which are neighbors to the first degree of the given cell including the mobile transceiver to which the computed interference parameter will be selected, i.e. data pertaining to each cell which is listed on the neighbor list related to the given cell, as in the previously described specific embodiment.

If the operator chooses N=2, data pertaining to cells which are neighbors to the first degree of the given cell including the mobile transceiver to which the computed interference parameter will be selected, and also data pertaining to cells which are neighbors to the second degree of the given cell, or, to put it differently, data pertaining to neighbors of the given cell. The choice of N=2 thus enables to add to the data taken into account by choosing N=1 data pertaining to each cell which is listed on each neighbor list related to each cell which is listed on the neighbor list of the given cell.

It will be easily understood that higher values of the neighborship degree N enable to obtain more accurate values for the interference parameter, but involve more processing power and memory space for computing the values.

Conversely, the more distant a cell is in a neighborship hierarchy related to the cell including the mobile transceiver for which the interference parameter is computed, the less significant data pertaining to this distant cell will be.

As stated above, the neighbor list of a given cell may be generated on the basis of the monitored set of the cell or by selecting cells whose coverage areas are adjacent to that of the given cell.

According to another aspect of the present invention, there is provided a simulation device for simulating operating conditions of a telecommunication system including a plurality of radio base stations and a plurality of mobile transceivers, the device including a computing device for computing at least one value of an interference parameter of at least one of the mobile transceivers, the interference parameter being indicative of an amount of interference affecting a communication between the mobile transceiver and an associated radio base station, an identification device for identifying radio base stations and mobile transceivers that generate a significant amount of interference affecting the communication, and a selection device for selecting data of radio base stations and mobile transceivers identified by the identification device for computation by the computing device.

According to another aspect of the present invention, there is provided a simulation device as described above, which further includes a list generation device for creating, for a given cell including a radio base station, a neighbor list containing identities of neighbor cells including radio base stations with which a mobile transceiver in the given cell could potentially establish a communication, the identification device identifying neighbor cells of the given cell including the mobile transceiver to which the interference parameter is computed.

According to a specific embodiment of the aspect described above, the identification device identifies cells which are neighbors to a predetermined degree of the cell including the mobile transceiver to which the interference parameter is computed.

According to another aspect of the present invention, there is provided a simulation device including a simulation module configured to simulate movements and ongoing communications of the mobile transceivers according to a given set of operating conditions of the radio base stations and transceivers, the simulation module including the computing device, the identification and selection devices and a management module configured to update the given set of operating conditions of the radio base stations and transceivers with respect to the simulated movements and ongoing communications of the mobile transceivers, the management module including the list generation device, wherein the simulation and management modules operate asynchronously with respect to each other.

The simulation according to the simulation module simulates the actual behavior of mobile transceivers, like the movements and ongoing communications thereof, and enables to reduce the number of generated situations to those who are consistent with each other and thus realistic, which in turn enables to reduce the amount of computing power required for operating the simulation device according to the invention.

The further feature wherein the simulation and management modules operate asynchronously with respect to each other enables to simulate the inertia linked to the decision process involved in the management of the telecommunication system.

According to yet another aspect of the present invention, a simulation device as described hereinbefore is used for testing a radio network controlling unit configured to manage ongoing communications between mobile transceivers and radio base stations in an actual deployment of a telecommunication system, whereby the radio network controlling unit is substituted for the management module.

This aspect of the invention enables testing of a manufactured radio network controller, which will have been designed and built for the purpose of managing a telecommunication system whose behavior will be realistically simulated by virtue of the invention. The invention thus enables to validate such a design without requiring to actually build the whole telecommunication system to this aim. This user-oriented aspect of the invention likewise allows to test decision-making algorithms included in a management module which would be provided by an operator of the simulation device and be substituted for the internal management module described above.

According to another aspect of the present invention, a simulation device as described hereinbefore is used for testing a radio base station to be included in the simulated telecommunication system when actually deployed, the radio base station is connected to the simulation module.

The invention thus enables to validate the design of a radio base station before its actual deployment in the field.

BRIEF DESCRIPTION OF THE DRAWINGS

The characteristics of the present invention mentioned above, as well as others, will emerge more clearly from a reading of the following description given in relation to the accompanying figures, amongst which.

DESCRIPTION OF EMBODIMENTS

Figure 1:
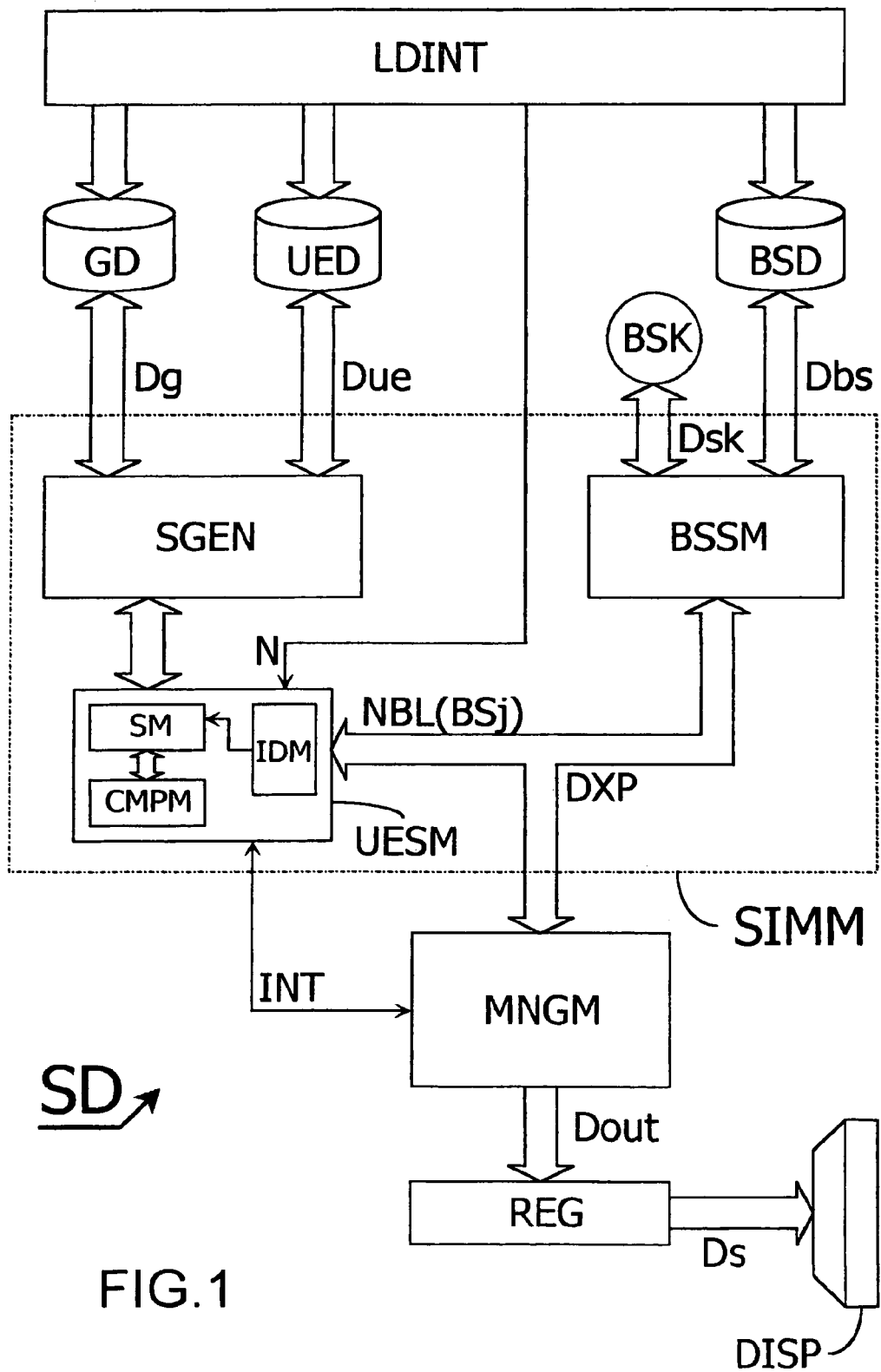
FIG. 1 is a functional diagram which depicts a simulation device using a method according to the present invention.

Referring now to the drawings where like reference designations identify the same or corresponding parts throughout the several views, FIG. 1 diagrammatically shows a simulation device SD intended to simulate operating conditions of a telecommunication system, in which a method according to the present invention is used. This device SD includes a first database GD, intended to store geographical data pertaining to a landscape over which the telecommunication system is intended to be deployed, for example models of obstacles like buildings, mountains, etc. The simulation device SD further includes a second database BSD, intended to store data pertaining to radio base stations forming a network in the system, like a geographical location of each base station, a maximum number of communications each base station is able to handle at a given instant, or a maximum transmitting power each base station is able to apply to its ongoing communications, etc. The simulation device SD also includes a third database UED, intended to store or generate a collection of files, each file being associated with a mobile transceiver which will appear during the simulation, and containing, listed in chronological order, successive coordinates, speeds, transmission powers or data rates to be attributed to ongoing communications between each mobile transceiver and a base station. The first and second databases GD and BSD thus contain data of a structural nature, representative of the deployment of the radio network in the system and of geographical constraints the network will operate under, whereas the third database UED contains dynamic data, representative of events which will happen during the operation of the system.

In this embodiment of the present invention, the first, second and third databases GD, BSD and UED are intended to be loaded by an operator of the simulation device SD by means of a loading interface LDINT.

The simulation device SD includes a simulation module SIMM intended to process data provided by the above mentioned first, second and third databases GD, BSD and UED by means of respective data signals Dg, Dbs and Due. The simulation module SIMM will generate successive snapshots of the system, by fetching, for each snapshot, a set of data from the first, second and third databases GD, BSD and UED, and performing a synthesis of the data by determining, among others, the amount of power applied by each mobile transceiver to its ongoing communication and/or the amount of interference generated by each mobile transceiver and its adverse effects on communications of other mobile transceivers. The third database UED may be arranged to provide, among other correlating parameters, instantaneous values of specified data rates for the various communications supported by the system at the corresponding instants, in which case the simulation module SIMM will determine an amount of power which must be applied to each mobile transceiver's ongoing communication for ensuring that the corresponding specified data rates is respected, and an interference level linked to this amount of power. In another possible embodiment, the third database UED will provide a value of the power, to be applied to each ongoing communication, and the simulation module SIMM will only have to determine, for each snapshot, the amount of interference generated by the ongoing communications.

The simulation module SIMM includes for such purposes a computing device CMPM for computing values of interference parameters related to individual mobile transceivers, each interference parameter, e.g. a power-to-interference or a signal-to noise ratio, being indicative of an amount of interference affecting a communication between a given mobile transceiver and an associated radio base station.

At the end of each snapshot-generating process, the simulation module SIMM delivers, via a management module which will be described in more detail hereinafter, a set of output data signals Dout representative of the results of the above-described synthesis to a register REG for storage purposes, the register REG is linked to a display interface DISP intended to deliver results of the simulation to the operator of the simulation device SD. The display interface DISP may be provided with a device for interpreting the output data Ds, which could enable the display interface DISP to extract from the output data Ds values of a parameter representative of communication quality, like a power-to-interference or a signal-to-noise ratio, to be attributed to each mobile transceiver, and for displaying such values, for example in varying colors or brightness on a map depicting the telecommunication system.

The present invention thus enables to provide an operator of the simulation device SD with a historical view of the operating conditions of the simulated system, and hence to follow the evolution over time of individual communications, from their beginnings to their ends, which in turn enables to assess the quality of the service provided to individual mobile transceivers.

In this embodiment of the present invention, the simulation device SD includes, in addition to the simulation module SIMM intended to simulate movements and ongoing communications of the mobile transceivers according to a given set of operating conditions of the radio base stations and transceivers, a management module MNGM intended to update the given set of operating conditions of the radio base stations and transceivers with respect to the simulated movements and ongoing communications of the mobile transceivers, the management module MNGM being intended, among other tasks, to determine for each snapshot which mobile transceiver should be in communication with which radio base station.

In this embodiment of the present invention, the simulation and management modules SIMM and MNGM operate asynchronously with respect to each other, which enables to simulate the inertia induced by the decision-taking process involved in an updating of the current set of operating conditions of the radio base stations and transceivers performed by the management module MNGM on the basis of stimuli provided by the simulation module SIMM.

Such stimuli are intended to be transmitted by the simulation module SIMM via a data exchange path DXP after the simulation module SIMM will have required an interruption, through an interruption path INT, of the operation of the management module MNGM. Such a solution enables each of the simulation and management modules SIMM and MNGM to operate independently with respect to each other while allowing data exchange between the modules.

More specifically, the management module MNGM includes a list generation device for creating, for a given cell including a radio base station BSj, a neighbor list NBL(BSj) containing identities of neighbor cells including radio base stations with which a mobile transceiver in the given cell could successfully establish a communication. The neighbor list NBL(BSj) of a given cell may for example be generated on the basis of the monitored set of the cell or by selecting cells whose coverage areas are adjacent to that of the given cell.

The management module MNGM is intended to provide the simulation module SIMM with these neighbor lists NBL(BSj) via the data exchange path DXP according to the process described above.

In this specific embodiment of the simulation device SD, the simulation module SIMM includes a scenario generating device SGEN for computing the position of each mobile transceiver according to a predefined trajectory the mobile transceiver is intended to follow, a transceiver simulation device UESM for emulating signals transmitted or received by each of the mobile transceivers, and including the computing device CMPM intended to compute an amount of power exhibited by signals transmitted by each mobile transceiver, as well as an amount of interference affecting the signals and a base station simulation device BSSM for emulating signals transmitted or received by each radio base station and radio links between the radio base stations and transceivers, and computing an amount of power exhibited by signals transmitted by each radio base station.

The base station simulation device BSSM will usually operate on the basis of data Dbs provided by the second database BSD, which contains models of the various radio base stations whose deployment is to be simulated. In the example described here, however, the base station simulation device BSSM is also connected to a real radio base station BSK with which they exchange data DSk in order to test the real behavior of this radio base station BSK when confronted with stimuli which emulate those it will encounter during its actual deployment. This allows to validate the design of a radio base station without actually building an entire telecommunication system to this aim.

On the basis of data signals Dg and Due provided by the first and third databases GD and UED, the scenario generating device SGEN compute, for each snapshot, the position of each mobile transceiver with respect to all other transceivers, and the amount of power involved in all ongoing communications, which will among others enable the transceiver simulation device UESM to determine the amount of interference caused by all ongoing communications to each individual ongoing communication.

In order to limit the processing power and memory space required for this purpose, the transceiver simulation device UESM further includes an identification device IDM for identifying radio base stations and mobile transceivers that generate a significant amount of interference affecting the communication and a selection device SM for selecting data of radio base stations and mobile transceivers identified by the identification device for computation by the computing device.

In this specific embodiment of the present invention, the identification device IDM identifies cells which are neighbors to a predetermined degree N of the cell including the mobile transceiver to which the interference parameter is computed, the value of the degree N having been previously loaded by an operator of the simulation device SD through the loading interface LDINT.

This specific embodiment enables to perform, in a simple and user-friendly manner, a compression of the data to be used by the computing device CMPM. An operator of the simulation device SD will only have to modify the value of the degree of neighborship N for tuning the accuracy of the computation performed by the computing device.

If the operator chooses N=1, only data pertaining to cells which are neighbors to the first degree of the given cell including the mobile transceiver to which the computed interference parameter will be selected, i.e. data pertaining to each cell which is listed on the neighbor list related to the given cell, as in the previously described specific embodiment.

If the operator chooses N=2, data pertaining to cells which are neighbors to the first degree of the given cell including the mobile transceiver to which the computed interference parameter will be selected, and also data pertaining to cells which are neighbors to the second degree of the given cell, or, to put it differently, data pertaining to neighbors of the given cell. The choice of N=2 thus enables to add to the data taken into account by choosing N=1 data pertaining to each cell which is listed on each neighbor list related to each cell which is listed on the neighbor list of the given cell.

Higher values of the neighborship degree N hence will enable to obtain more accurate values for the interference parameter, but will involve more processing power and memory space for computing more accurate values.

Figure 2:
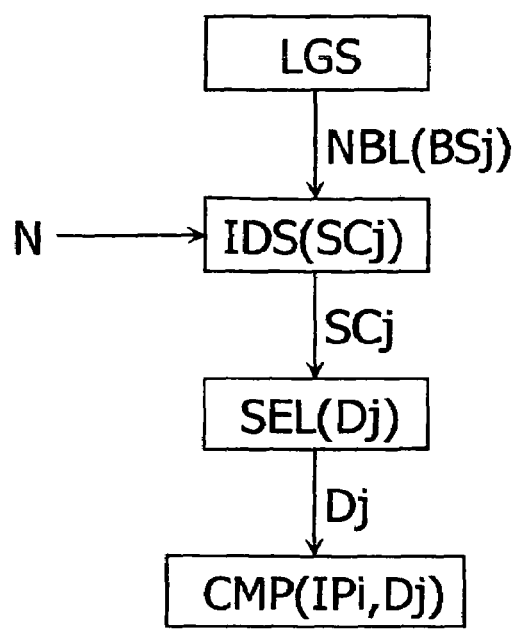
FIG. 2 is a flowchart, which depicts successive steps to be executed in a method according to the present invention.

FIG. 2 is a flow chart showing a method of simulating operating conditions of a telecommunication system including a plurality of radio base stations and a plurality of mobile transceivers, the method including a step CMP(IPi, Dj) of computing at least one value of at least one interference parameter related to one of the mobile transceivers, the interference parameter being indicative of an amount of interference affecting a communication between the mobile transceiver and an associated radio base station, a step IDS(SCj) of identifying cells SCj including radio base stations BSj and mobile transceivers that generate a significant amount of interference affecting the communication and a step SEL(Dj) of selecting data Dj of cells SCj identified during the identification step IDS(SCj) for execution of the computing step CMP(IPi, Dj).

The method described in this example also includes a step LGS of creating, for a given cell including a radio base station BSj, a neighbor list NBL(BSj) containing identities of neighbor cells including radio base stations with which a mobile transceiver in the given cell could successfully establish a communication. The neighbor list NBL(BSj) of a given cell may be generated on the basis of the monitored set of the cell or by selecting cells whose coverage areas are adjacent to that of the given cell.

The identification step IDS(SCj) identifies cells SCj which are neighbors to a predetermined degree N of the cell including the mobile transceiver to which the interference parameter is computed, which enables to tune, in a simple and user-friendly manner, a ratio of compression of the data to be used during the computing step CMP(IPi, Dj), by adjusting the value of the degree of neighborship N. Such a compression enables to reduce the amount of processing power and memory space required for executing the computing step CMP(IPi, Dj), which will be all the more advantageous if various values of a plurality of interference parameters related to a plurality of mobile transceivers are to be computed, since the above described compression will affect all data which are to be used during such a computation.

Figure 3:
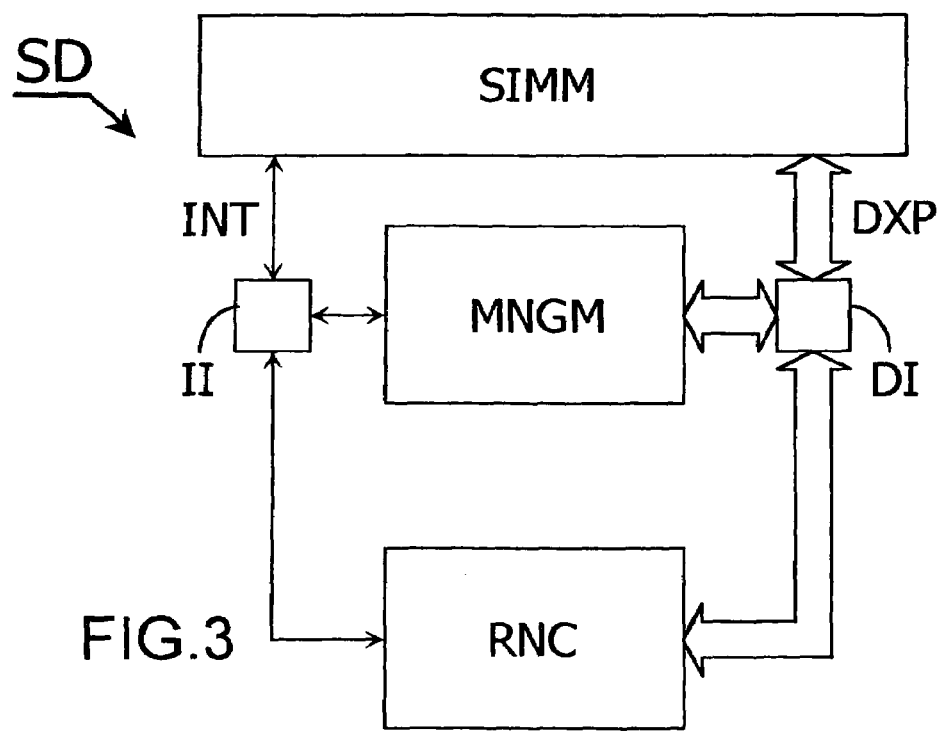
FIG. 3 is a functional diagram which depicts a possible use of a simulation device according to the present invention.

FIG. 3 depicts a possible use of the simulating device SD according to the invention, which enables to validate the design of an external radio network controller RNC. Such a controller is intended to manage the operation of a 3G system when actually deployed. A radio network controller RNC is usually built by telecommunication system manufacturers according to internal proprietary specifications which are unknown to the tester, but are intended to communicate with a 3G telecommunication network by means of messages whose format is set by the 3GPP standard specification. The simulation device SD thus includes an interruption interface II allowing to translate messages sent by the simulation module SIMM via the interruption path INT into the suitable format specified by the 3GPP standard in order for these messages to be intelligible for the radio network controller RNC. The simulation device SD further includes a data interface DI allowing to translate messages sent via the data exchange path DXP to/from the simulation module SIMM by/to the radio network controller RNC. Thanks to these interfaces, the radio network controller RNC may be arranged to simply shunt the management module MNGM and be substituted for it. The invention then enables to easily and realistically simulate the behavior of such a radio network controller RNC, without requiring to actually build an entire telecommunication system to this aim.

In a similar mobile user-oriented aspect of the present invention, the simulation device may be used for testing decision-making algorithms included in an external management module which would be provided by an operator of the simulation device SD and be substituted for the radio network controller RNC, and thus also for the internal management module MNGM.

Figure 4:
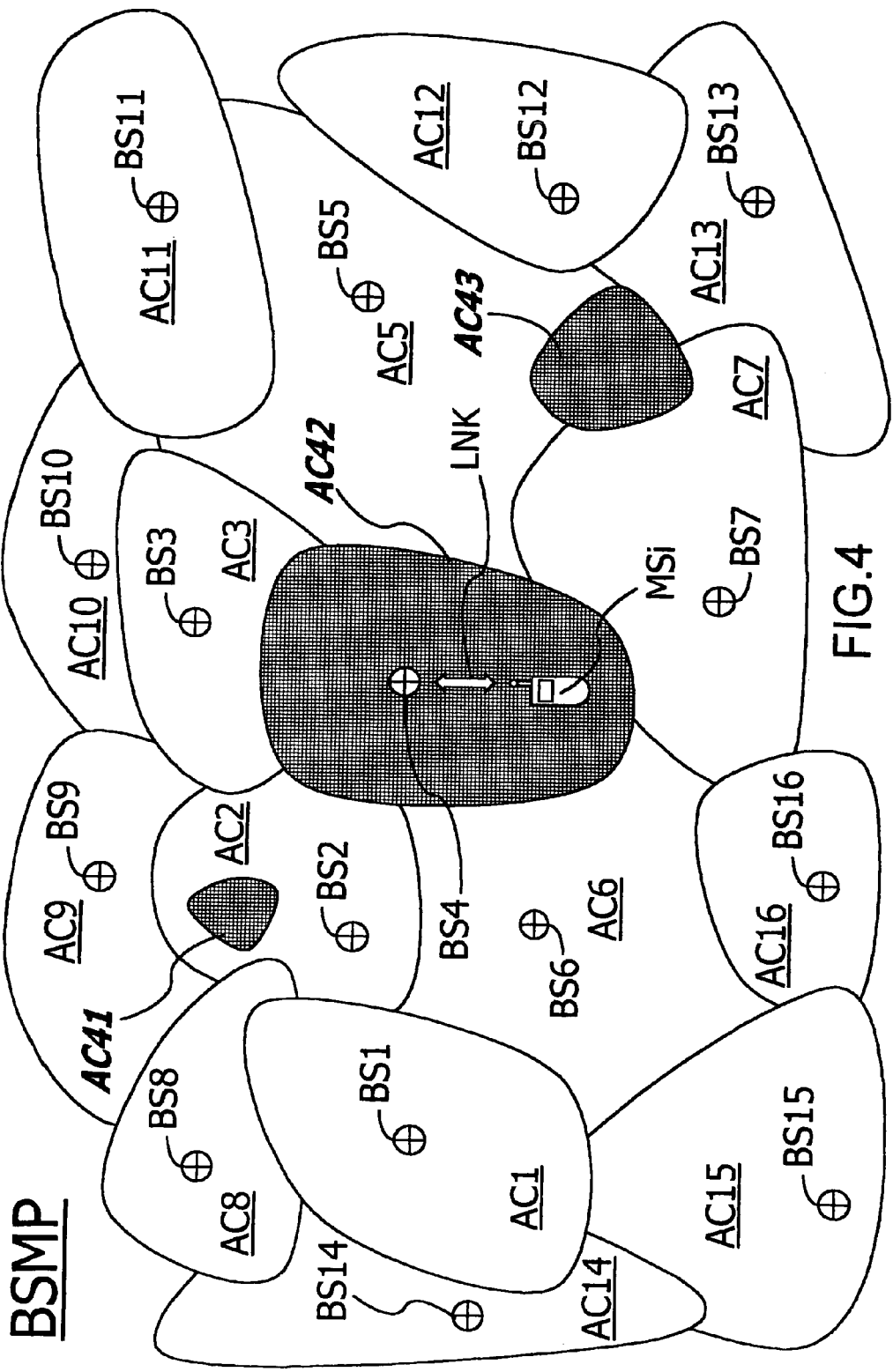
FIG. 4 is a schematic which represents a simplified best-server map to be used during the execution of a list generation step included in a method according to the present invention.

FIG. 4 is a schematic diagram which represents a best-server map BSMP of a 3G telecommunication system, which map has been generated by executing a mapping step during a neighbor list generating step. This best-server map BSMP exhibits coverage areas AC1 . . . AC16 of cells including radio base stations BS1 . . . BS16, which means that in the coverage area ACk of a given cell, the radio base station BSk included in the cell will offer the best possible communication quality to a mobile transceiver located within the coverage area ACk. This communication quality may be assessed by analyzing parameters such as Coupling Loss (CL) values, Received Signal Code Power (RSCP), Common Pilot CHannel (CPCH) strength, Energy Chip/Noise (EC/NO), etc.

In this example, a particular cell including a radio base station BS4 is singled out as exhibiting a coverage area composed of three separate coverage areas AC41, AC42 and AC43. This may sometimes happen due to landscape features which may cause a given coverage area, like in this example areas AC2, AC5 or AC7, to include one or several pockets where a base station like base station BS4, which is not the base station nominally associated with the given area, in this example base stations BS2, BS5 or BS7, will provide the best service to a mobile transceiver located within such a pocket.

In the situation depicted here, a communication is established between a mobile transceiver MSi and the radio base station BS4 through a radio link LNK. This communication will feature a quality which will be adversely affected by communications going on in the same or other cells, which quality, or loss thereof, may be quantified by using an interference parameter like a signal-to-noise or a power-to-interference ratio. While all other communications simultaneously existing in the telecommunication system are taken into account in known simulating methods, the method according to a preferred embodiment of the present invention enables to reduce the amount of data to be processed by identifying, and selecting as significant, only data pertaining to cells which are neighbors to a predetermined degree of the cell including the mobile transceiver to which the interference parameter is computed.

Neighbor lists are thus generated for each cell, so that if a neighborship degree equal to N has been chosen, the significant data to be taken into account for computing the interference parameter associated with a mobile transceiver located within a given cell will be data pertaining to the given cell, data pertaining to cells listed in the neighbor list of the given cell, i.e. of the first neighborship degree, cells listed in each neighbor list of each cell listed in the neighbor list of the given cell, i.e. of the second neighborship degree, and so on to the Nth degree.

The neighbor list of a given cell may be generated by taking into account only geographical features of the best server map, i.e. by selecting only those cells which have a coverage area which is adjacent to that of the given cell. In this example, the neighbor list of the cell including the base station BS4 would thus includes the cells which include radio base stations BS2, BS3, BS5, BS6, BS7 and BS13, the latter being included in this neighbor cell list because of the AC43 pocket. According to such a scheme, the neighbor list of the cell including the base station BS2 would thus include the cells which include radio base stations BS1, BS3, BS4, BS6, BS8, and BS9, so that if a neighborship degree N=2 was selected for performing an identifying step in order to compute an interference parameter relating to a mobile transceiver located within the coverage area associated with radio base station BS4, data pertaining to cells including radio base stations BS1, BS8, and BS9 would be selected in addition to data pertaining to cells including radio base stations BS2, BS3, BS5, BS6, BS7 and BS13, as would be data pertaining to cells listed in the neighbor cells including each of the other radio base stations BS3, BS5, BS6, BS7 and BS 13.

In this example where N=2, data pertaining to cells including radio base stations BS1, BS2, BS3, BS4, BS5, BS6, BS7, BS8, BS9, BS10, BS11, BS12, BS13, BS15, and BS16 will be selected for executing the computing step. Data pertaining to the cell including radio base station BS14 will not be selected, since this cell is a neighbor of the cell including radio base station BS4 only to the third degree, as being a neighbor to the first degree of the cells including radio base stations BS1, BS8 and BS15, themselves being neighbors to the second degree of the cell including radio base station BS4.

The neighbor list of a given cell may be also generated on the basis of the monitored set corresponding to the given cell.

The method of simulating operating conditions of a telecommunication system and the simulation device according to the present invention are not limited to the embodiments stated earlier. Various modifications are possible without departing the spirit of the invention.

The invention claimed is:

1. A method of simulating operating conditions of a telecommunication system including a plurality of radio base stations and a plurality of mobile transceivers, comprising:
   simulating the telecommunication system to create at least one operation condition between the plurality of radio base stations and the plurality of mobile transceivers;
   computing at least one value of at least one interference parameter of one of said mobile transceivers of the at least one operation condition of said simulating or selecting, the at least one interference parameter being indicative of an amount of interference affecting a communication between said mobile transceiver and an associated radio base station;
   identifying radio base stations and mobile transceivers that generate an amount of interference attaining a predetermined level of significance and affecting said communication; and
   selecting data of an operation condition of radio base stations and mobile transceivers identified during the identifying for an execution of the computing.

2. A method according to claim 1, further comprising:
   a step of creating, for a given cell including a radio base station, a neighbor list containing identities of neighbor cells including radio base stations with which a mobile transceiver in said given cell could potentially establish a communication, the identification step identifying neighbor cells of said given cell including the mobile transceiver to which the at least one interference parameter is computed.

3. A method according to claim 2, wherein the identification step comprises:
   identifying cells which are neighbors to a predetermined degree of said given cell including the mobile transceiver to which the at least one interference parameter is computed.

4. A method according to claim 2, wherein the step of creating a neighbor list comprises creating a list comprising cells generated by a radio network controller and broadcasted to all mobile transceivers included in each given cell.

5. A method according to claim 2, wherein the step of creating a neighbor list comprises creating a list comprising cells having a coverage area geographically adjacent to a coverage area of said given cell.

6. A method according to claim 2, further comprising discarding all data not pertaining to cells included in the neighbor list of said given cell.

7. A method according to claim 1, wherein the identifying comprises identifying radio base stations and mobile transceivers that generate an amount of interference attaining a predetermined level of significance, but not radio base stations and mobile transceivers that generate an amount of interference attaining a predetermined level of maximum significance, to dispense with a need to establish a ranking of amounts of interference.

8. A method according to claim 1, wherein the identifying comprises using a degree of significance expressed by choosing at least one specific criterion decorrelated from the data.

9. A simulation device for simulating operating conditions of a telecommunication system including a plurality of radio base stations and a plurality of mobile transceivers, comprising:
   simulation means for simulating the telecommunication system to create at least one operation condition between the plurality of radio base stations and the plurality of mobile transceivers;
   computing means for computing at least one value of an interference parameter of at least one of said mobile transceivers of the at least one operation condition of said simulating means or selecting means, the interference parameter being indicative of an amount of interference affecting a communication between said mobile transceiver and an associated radio base station;
   identification means for identifying radio base stations and mobile transceivers that generate an amount of interference attaining a predetermined level of significance and affecting said communication; and selection means for selecting data of an operation condition of radio base stations and mobile transceivers identified by the identification means for computation by the computing means.

10. A simulation device according to claim 9, further comprising:
list generation means for creating, for a given cell including a radio base station, a neighbor list containing identities of neighbor cells including radio base stations with which a mobile transceiver in said given cell could potentially establish a communication, the identification means identifying neighbor cells of said given cell including the mobile transceiver to which the interference parameter is computed.

11. A simulation device according to claim 10, wherein the identification means identify cells which are neighbors to a predetermined degree of said given cell including the mobile transceiver to which the interference parameter is computed.

12. A simulationdevice according to claim 9, comprising:
simulation means for simulating movements and ongoing communications of said mobile transceivers according to a given set of operating conditions of the radio base stations and transceivers, said simulation means including the computing means, the identification and selection means; and
management means for updating said given set of operating conditions of the radio base stations and transceivers with respect to said simulated movements and ongoing communications of said mobile transceivers, said management means including the list generation means,
wherein the simulation and management means operate asynchronously with respect to each other.

13. A method of testing a radio network controlling unit configured to manage ongoing communications between mobile transceivers and radio base stations in an actual deployment of a telecommunication system, comprising:
using a simulation device to simulate a behavior of said radio network controlling unit, said radio network controlling unit substituting for a management module, by performing the steps of:
computing at least one value of an interference parameter of at least one of said mobile transceivers, the interference parameter being indicative of an amount of interference affecting a communication between said at least one mobile transceiver and an associated radio base station;
identifying radio base stations and mobile transceivers that generate an amount of interference attaining a predetermined level of significance and affecting said communication;
selecting data of radio base stations and mobile transceivers identified by the identifying step for computation;
simulating movements and ongoing communications of said mobile transceivers according to a given set of operating conditions of the radio base stations and transceivers; and
updating said given set of operating conditions of the radio base stations and transceivers with respect to said simulated movements and ongoing communications of said mobile transceivers,
wherein the simulating and updating steps operate asynchronously with respect to each other.

14. A method of testing a radio base station configured to be included in a simulated telecommunication system when actually deployed, comprising:
using a simulation device to simulate a behavior of said radio base station, said radio base station being connected to a simulation module, by performing the steps of:
computing at least one value of an interference parameter of at least one of said mobile transceivers, the interference parameter being indicative of an amount of interference affecting a communication between said at least one mobile transceiver and an associated radio base station;
identifying radio base stations and mobile transceivers that generate an amount of interference attaining a predetermined level of significance and affecting said communication;
selecting data of radio base stations and mobile transceivers identified by the identifying step for computation;
simulating movements and ongoing communications of said mobile transceivers according to a given set of operating conditions of the radio base stations and transceivers; and
updating said given set of operating conditions of the radio base stations and transceivers with respect to said simulated movements and ongoing communications of said mobile transceivers,
wherein the simulating and updating steps operate asynchronously with respect to each other.

15. A simulation device for simulating operating conditions of a telecommunication system including a plurality of radio base stations and a plurality of mobile transceivers, comprising:
a simulation device configured to simulate the telecommunication system to create at least one operation condition between the plurality of radio base stations and the plurality of mobile transceivers;
a computing device configured to compute at least one value of an interference parameter of at least one of said mobile transceivers of the at least one operation condition of said simulating device or selecting device, the interference parameter being indicative of an amount of interference affecting a communication between said mobile transceiver and an associated radio base station;
an identification device configured to identify radio base stations and mobile transceivers that generate an amount of interference attaining a predetermined level of significance affecting said communication; and
a selection device configured to select data of an operation condition of radio base stations and mobile transceivers identified by the identification device for computation by the computing device.

16. A simulation device according to claim 15, further comprising:
a list generation device configured to create, for a given cell including a radio base station, a neighbor list containing identities of neighbor cells including radio base stations with which a mobile transceiver in said given cell could potentially establish a communication, the identification device identifying neighbor cells of said given cell including the mobile transceiver to which the interference parameter is computed.

17. A simulation device according to claim 16, wherein the identification device identifies cells which are neighbors to a predetermined degree of said given cell including the mobile transceiver to which the interference parameter is computed.

18. A simulation device according to claim 16, wherein the list generation device is configured to create a neighbor list comprising cells generated by a radio network controller and broadcasted to all mobile transceivers included in each given cell.

19. A simulation device according to claim 16, wherein the list generation device is configured to create a neighbor list comprising cells having a coverage area geographically adjacent to a coverage area of said given cell.

20. A simulation device according to claim 16, wherein all data not pertaining to cells included in the neighbor list of said given cell is discarded.

21. A simulation device according to claim 15, comprising:
- a simulation module configured to simulate movements and ongoing communications of said mobile transceivers according to a given set of operating conditions of the radio base stations and transceivers, said simulation module including the computing device, the identification and selection devices; and
- a management module for updating said given set of operating conditions of the radio base stations and transceivers with respect to said simulated movements and ongoing communications of said mobile transceivers, said management module including the list generation device,
- wherein the simulation and management modules operate asynchronously with respect to each other.

22. A simulation device according to claim 21, comprising:
- a first memory configured to store a first database of geographical data pertaining to a landscape over which the telecommunication system is to be deployed;
- a second memory configured to store a second database of data pertaining to radio base stations forming a network in the telecommunication system; and
- a third memory configured to store a third database of configured to store collections of files, each file being associated with a mobile transceiver to appear during the simulation.

23. A simulation device according to claim 22, wherein each file contains in chronological order successive coordinates and speeds attributed to ongoing communications between each mobile transceiver and a base station.

24. A simulation device according to claim 23, wherein each file further contains in chronological order transmission powers or data rates attributed to ongoing communications between each mobile transceiver and a base station.

25. A simulation device according to claim 15, wherein the identification device is configured to identify radio base stations and mobile transceivers that generate an amount of interference attaining a predetermined level of significance, but not radio base stations and mobile transceivers that generate an amount of interference attaining a predetermined level of maximum significance, to dispense with a need to establish a ranking of amounts of interference.

26. A simulation device according to claim 15, wherein the identification device is configured to use a degree of significance expressed by choosing at least one specific criterion decorrelated from the data.

27. A simulation device according to claim 15, comprising:
- a first memory configured to store a first database of geographical data pertaining to a landscape over which the telecommunication system is to be deployed;
- a second memory configured to store a second database of data pertaining to radio base stations forming a network in the telecommunication system; and
- a third memory configured to store a third database of collections of files, each file being associated with a mobile transceiver to appear during the simulation.

28. A simulation device according to claim 27, wherein each file contains in chronological order successive coordinates and speeds attributed to ongoing communications between each mobile transceiver and a base station.

29. A simulation device according to claim 28, wherein each file further contains in chronological order transmission powers or data rates attributed to ongoing communications between each mobile transceiver and a base station.

* * * * *